UNITED STATES PATENT OFFICE.

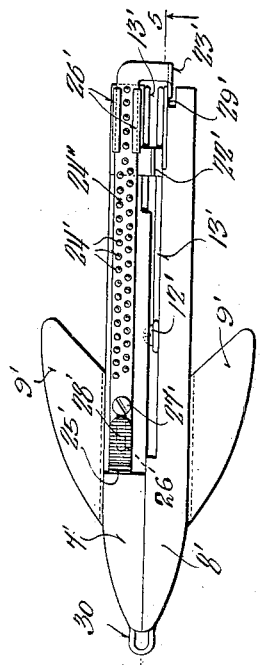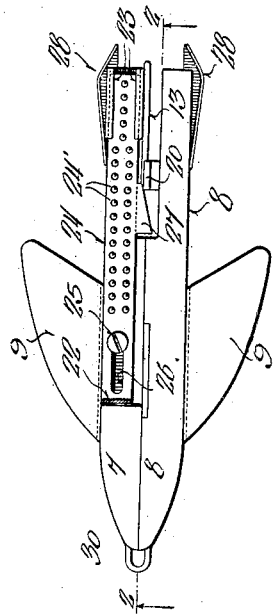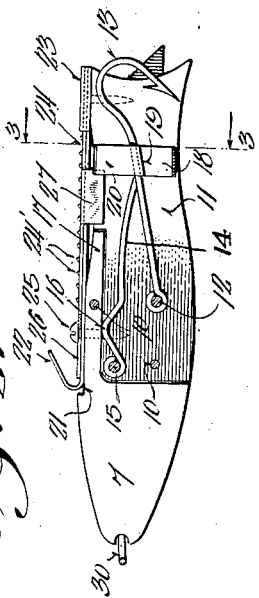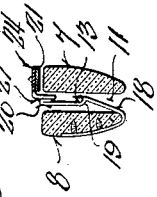

PAUL VIEHWEGER, OF MILWAUKEE, WISCONSIN.

ARTIFICIAL BAIT.

1,348,670.     Specification of Letters Patent.     Patented Aug. 3, 1920.

Application filed May 27, 1919. Serial No. 300,081.

*To all whom it may concern:*

Be it known that I, PAUL VIEHWEGER, a citizen of the present Government of Germany, (but who have received my first papers for citizenship in the United States,) and resident of Milwaukee, in the county of Milwaukee and State of Wisconsin, have invented new and useful Improvements in Artificial Bait, of which the following is a description, reference being had to the accompanying drawings, which are a part of this specification.

The present invention relates to certain new and useful improvements in artificial bait for fishing, and has for its primary object to provide an artificial bait capable of repeated use and which will be adapted for use for either casting or trolling.

Another object of the invention is to provide an artificial bait of the class described which swims and acts like a fish in the water and which when operated, catches the fish in the tongue and consequently stops its breathing and insures the catch.

A further object of the present invention is to provide an artificial bait of the class described which will be so constructed as to be weedless.

With the above and other objects in view which will appear as the description proceeds, my invention resides in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawing, I have illustrated two complete examples of the physical embodiment of the best modes I have so far devised for the practical application of the principles of my invention, and in which:

Figure 1 is a top plan view of my invention embodying a single operating hook.

Fig. 2 is a longitudinal and sectional view taken on the line 2—2 of Fig. 1.

Fig. 3 is a transverse sectional view taken on the line 3—3 of Fig. 2.

Fig. 4 is a top plan view of an artificial bait embodying two hook members.

Fig. 5 is a longitudinal sectional view taken on the line 5—5 of Fig. 4, and

Fig. 6 is a transverse sectional view taken on the line 6—6 of Fig. 5.

Referring now to the accompanying drawing and more particularly to Figs. 1, 2 and 3, 7 and 8 represent the two body members forming the bait, provided near their forward ends with laterally projecting fins 9 for guiding the same and controlling its passage through the water, the body members being secured together by means of rivets or other means 10.

The members 7 and 8 are recessed as at 11 near their rear ends to provide a central hook receiving chamber, and having pivoted in said chamber as at 12 a hook member 13 which has its outer hooked end normally urged outwardly of the chamber by means of a spring 14 having one end pivoted in the chamber as at 15 and its other end impinging against the hook 13 medially of its ends, spring 14 having a V-shaped bend 16 near its pivoted ends to impinge against a rearwardly projecting wall 17 at the top of the chamber whereby the proper tension is imparted to spring 14.

To releasably retain the hook 13 within said chamber against the action of spring 14, I provide a spring keeper 18 which has one end thereof secured to the body member 8 and is then directed upwardly and toward the section 7 and has formed medially of its portion disposed in said chamber, a locking shoulder 19 adapted to receive the shank of the hook 13. Keeper 18 is then directed upwardly to a plane parallel with the top of the members 7 and 8 and then folded upon itself as at 20. The keeper 18 is formed of spring steel and its portion disposed in the hook receiving chamber is normally urged toward the member 7 so that when the hook 13 is disposed within the chamber, shoulder 19 will engage therebehind and retain the same against the action of the spring. The keeper 18 is adapted to be released upon the grasping of the bait by a fish by the means hereinafter described.

Longitudinally disposed in the top side of member 7 is a plate 21 which has its forward end curved and then inclined rearwardly a slight distance as at 22 to provide a weedguard, and its rear end portion having the longitudinal edges thereof flanged upwardly and then inwardly as at 23 to provide guiding means for an actuating plate 24 slidably disposed on the plate 21 and retained in place by flanges 23 and a screw bolt 25 passing through an elongated opening 26 in the forward end of the plate 24. Plate 24 has formed on its inner edge medially of the ends thereof, and projecting into the hook receiving chamber, a cam member 27 which is adapted upon the rearward movement of plate 24, to move the end 20 of keeper 18 away from the body member 7 and thus release the hook 13 from the locking shoulder 19 and allow the same to be forcibly thrown outwardly from the hook receiving chamber. In order to insure the actuation of plate 24 when engaged by a fish, the plate 24 has its top surface serrated as at 24'.

When it is desired to reset the bait after the same has been actuated, it is simply necessary to move the plate 24 inwardly its entire limit of movement and then move hook 13 into the chamber against the action of its spring until its shank passes the locking shoulder 19 and is then engaged thereby. The body members are provided near their rear ends with suitable weighting devices 28 which will insure the proper travel through the water and balance of the bait.

Referring now more particularly to Figs. 4, 5 and 6, the body members 7' and 8' are held in substantially pivotal engagement by means of a securing bolt 10' and secured to their outer sides near their forward ends is a pair of guiding fins 9'. The body members are each formed near their rear ends with an elongated recess 11' to define a central hook receiving chamber.

Pivotally carried by each body member as at 12' is a pair of hook members 13' having their outer hooked ends disposed in opposite directions as best shown in Fig. 5. The hooks 13' are normally urged outwardly of the hook receiving chamber in opposite directions by means of a pair of springs 14' pivoted in the chamber as at 15' and provided with a V-shaped bend 16' near its pivoted end to abut against the inwardly projecting walls 17' and 18' of the body members. As best shown in Fig. 5 one hook member 13' and its spring 14' is carried by each body member and is urged outwardly of the hook receiving chamber by its spring. The hooks 13' are releasably retained in the hook receiving chamber against the action of the springs 14' by means of keepers 19' secured to the members 7' and 8'.

The keepers 19' are preferably formed of spring steel, and the keeper carried by member 7' has one end 20' secured to the outer wall of said member and is projected into the hook receiving chamber from the top wall thereof, and provided medially of its portion disposed in said chamber with a locking shoulder 21' and having its end 22' straight. The other keeper 19' is similar to the one described with the exception that it projects into the hook receiving chamber from the lower edge of member 8'. Each keeper 19' is normally urged away from the body member to which it is secured.

To lock the hooks 13' within the hook receiving chamber, one hook 13' is moved inwardly until its shank engages behind the locking lug of its keeper and then the members 7' and 8' are pressed together until the keeper is urged against its body member by the pressure thereagainst of the end 22' of the other keeper. The other hook 13' is then moved inwardly until it is engaged behind the locking lug of its keeper, forcing the locking lug away from its body member when it passes thereby, and then springing back of the hook shank. With the keepers and the hook members in this position, the members 7' and 8' are then locked together by means of a depending lug 23' formed on the outer end of a plate 24" carried by a plate 25' similar to the plate 21, and slidably held thereon by means of the guide flanges 26' and a screw bolt 27'. The plate 24" is also serrated as at 24' to insure its operation when engaged by a fish, and the plate 25' has its forward end inclined rearwardly as at 28' to provide a weedguard. The operation of the form of my invention as just described is as follows:

Upon the engagement with the serrations of plate 24" by a fish, the plate will be moved rearwardly, disengaging the lug 23' from engagement with a locking recess 29' in the rear end portion of member 8' and thus allowing the two body members 7' and 8' to be moved away from each other by means of the keepers 19' which will disengage the locking shoulders 21' from the hooks 13', allowing the same to be thrust outwardly of the hook receiving opening by means of their springs 14' and to be engaged in the mouth of the fish.

The forward end of the bait carries a line receiving member 30 which has each end thereof secured to one of the body members of the bait.

From the foregoing description taken in connection with the accompanying drawing, it will be obvious that I provide an artificial bait which will be positive in its operation, which will have all the appearances of a fish while in the water, and which will be practical for the purposes as described.

What I claim as my invention is:—

1. A device of the class described comprising a body member provided near one end thereof with a centrally disposed elongated recess, a hook member adapted to be normally concealed within said recess and having one end pivoted therein, spring means normally urging the free end of the hook member outwardly of said recess, a substantially U-shaped spring member carried by the body member and extended into said recess to engage the hook member and releasably secure the same against the action of its spring, and means for releasing the keeper from engagement with the hook member.

2. A device of the class described comprising a body member provided near one end thereof with a centrally disposed elongated recess, a hook member adapted to be normally concealed within said recess and having one end pivoted therein, spring means normally urging the free end of the hook member outwardly of said recess, a substantially U-shaped spring member having a part projected into said recess and engageable with the hook member to releasably secure the same against the action of its spring, a plate movable along one side of the body member, and means carried by said plate for releasing said keeper from engagement with said hook.

3. A device of the class described, comprising, a two-part body member centrally provided with an elongated recess near the rear end thereof, hook members adapted to be concealed within said recess and having their inner ends pivoted therein, spring means normally urging said hook members outwardly in the recess in opposite directions, spring members normally urging the rear ends of said two-part member away from each other and adapted to retain said hook members against action by said spring means when said two-part body member is held against the action of said spring members, and means for releasably retaining said two-part body member against the action of said spring members.

4. A device of the class described comprising a two part body member provided with a substantially centrally elongated recess, a hook member having one end pivoted within said recess and normally concealed therein, spring means normally urging the free end of the hook member outwardly of said recess, a spring keeper disposed within said recess and normally urging the rear ends of said two part body member away from each other and engageable with said hook member when the two part body member is held against the action of said spring keeper, and means for releasably retaining said two part body member against the action of said spring keeper.

In testimony whereof I affix my signature.

PAUL VIEHWEGER.